United States Patent Office 3,076,712
Patented Feb. 5, 1963

3,076,712
PROCESS FOR TENDERING AND PRESERVING MEAT
Beverly E. Williams, La Grange Park, Ill., assignor to Hodges Research and Development Company, New York, N.Y., a corporation of California
No Drawing. Filed Sept. 6, 1960, Ser. No. 53,887
1 Claim. (Cl. 99—107)

This invention relates to processes for tendering and preserving meat and more particularly to such processes in which the tendering action of an enzyme is terminated or arrested before the meat is made mushy or too tender, and, at the same time, the terminator or arrestor acts to preserve the meat.

It has heretofore been proposed to inject proteolytic enzymes both ante mortem, as in Beuk U.S Patent No 2,903,362, and post mortem into cattle or beef for the purposes of tendering the meat. When the cattle are injected ante mortem they are slaughtered from about one-half to four hours, or longer, after injection. When the injection is post mortem it is most conveniently done by stitch pumping the solution of the enzyme into the carcass, side, or cuts of meat. In all prior uses of the proteolytic enzymes it had been necessary to employ an arrestor to terminate the activity of the enzyme before the meat becomes overly tendered. Usually the meat is frozen after the enzyme has had an opportunity to act and this terminates the activity of the enzyme or the meat may be cooked which also terminate the activity of the enzyme. In either case, the meat loses its characteristic and designation of fresh meat.

It has also been proposed to inject cattle both ante mortem and post mortem with a broad spectrum antibiotic to preserve the meat by counteracting bacterial decomposition. Ante mortem injection of broad spectrum antibiotics has been successfully accomplished by injection at the base of the tail or into the aorta or into the intraperitoneal cavity and the cattle are then slaughtered within one-half to four hours. It has been found that if the animal is slaughtered from thirty minutes to four hours after injection that a uniform good tissue level of antibiotic is obtained to prevent bacterial decomposition.

In post mortem injection of the broad spectrum antibiotics the antibiotic is best employed in an aqueous solution and stitch pumped into the carcass, side, or cuts of meat in sufficient amount to compensate for loss of moisture during the hanging and aging of the meat.

Antibiotics are chemical substances which are usually defined as being produced by living microorganisms and which have the capacity in dilute solution of interfering with life processes of other microorganisms so as to prevent their multiplication or cause their destruction. In present practice in the industry, however, the term "antibiotics" is also used to designate chemical substances produced by synthetic methods which are identical with or closely related to the natural product of living microorganisms. A very large number of antibiotics have been isolated. Of these, those which have become of some commercial importance include penicillin (including the entire group of natural, synthetic and semisynthetic penicilins of varying specific structure), streptomycin and dihydrostreptomycin, tetracycline, chlortetracycline, chloramphenicol, oxytetracycline, neomycin, bacitracin, polymycin, erythromycin, fumigallin, tryothricin, and a few others. Some of the more recently developed antibiotics, which are unusual in having broad-spectrum antifungal activity, as distinguished from antibacterial activity, include, for example, tennecetin, nystatin, and so forth. Additionally, for use in practicing the method of this invention, the antibiotic should be one exhibiting a broad spectrum antibacterial action. While a number of antibiotics are available which can be used for the present purposes, the particularly preferred type comprises the tetracyclines. This group includes tetracycline and also chlortetracycline and oxytetracycline. Chlortetracycline and oxytetracycline, particularly oxytetracycline, are especially preferred. These antibiotics have a broad spectrum of antibacterial activity, being effective against both gram-positive and gram-negative bacteria, aerobic and anaerobic, such as salmonella, micrococci and clostridia.

The tetracyclines are closely congeneric derivatives of the polycylic naphthacenecarboxamide. The sensitivity or resistance of a particular microorganism to the three congeners is quite similar. Their structural formulas are as follows:

(1) Chlortetracycline

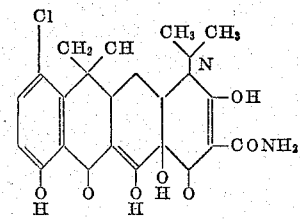

(2) Tetracycline

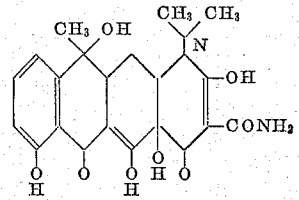

(3) Oxytetracycline

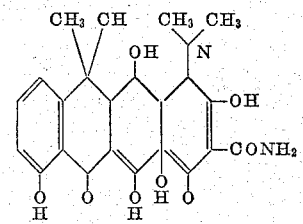

The crystalline bases are faintly yellow, odorless, slightly bitter compounds. They are only slightly soluble in water at pH 7 (0.25 to 0.5 mgm. per milliliter), but they form soluble salts and hydrochlorides. Instability of solutions of all the teracyclines increases with pH and temperature. At the temperatures used in cooking, these antibiotics will decompose with relative ease. The bases and the hydrochlorides are stable indefinitely as dry powders. The antibiotics may be used in any of their known, antibacterially active forms, such as the base or acid per se, or salts. For instance, the tetracycline antibiotics (oxytetracycline, chlortetracycline and tetracycline) may be used as the free, amphoteric compounds, as the hydrochlorides, sulfates and other acid salts, or as the sodium, potassium and other metal salts.

The solubility of oxytetracycline will generally be enhanced by converting it to a salt thereof such as the hydrochloride. It may, if desired, be combined with other chemical compounds which have a favorable effect on its solubility. Thus, for example, a preparation containing oxytetracycline in combination with citric acid may be used. The citric acid has a favorable effect in solubilizing the oxytetracycline and protects it by chelating some of the metal ions such as calcium which may be present in the water supply.

I have found most unexpectedly that if an injection solution including both a broad spectrum antibiotic and a proteolytic enzyme is employed both in ante mortem and post mortem injection unusual and synergistic results are obtained. Cattle injected ante mortem at the base of the tail with a proteolytic enzyme, when thereafter slaughtered, showed no improved tenderness of the meat and little distribution of the enzyme took place from the area of injection probably because of the large molecule of the enzyme.

When the enzyme and the antibiotic are combined in the injection solution the antibiotic helps carry and diffuse the enzyme throughout the vascular system. Thereafter when the cattle are slaughtered and hung in the cooler most significant improvement in the tenderness of the meat is noted in from 1 to 10 days. The antibiotic counteracts bacterial decomposition.

In post mortem injection of a solution containing a proteolytic enzyme and a broad spectrum antibiotic it has been found that relatively small amounts of the enzyme are required to provide greatly improved tendering of the meat if the solution is injected into the carcass, side or cut of meat before rigor mortis. If the meat has been chilled then larger amounts of the enzyme, up to 100 times as much are required to provide the desired tendering of the meat. Because of the antibacterial activity of the antibiotic, the temperature of the injection solution may be substantially higher than the meat temperature, thus promoting tenderization. Temperatures above 140° F. would tend to cook or sear the meat. Enzyme activity is terminated at temperatures above 160° F. and the broad spectrum antibiotics are destroyed at cooking temperature levels.

Since the antibiotic reduces bacterial deterioration which has great influence on the tenderness of the meat during normal hanging and aging it follows that meat treated with an antibiotic remains "green," does not become tender, and does not "age" on normal hanging. The proteolytic enzyme, on the other hand, acts to tender the meat, and if not terminated, will make the meat too tender and/or mushy. Most unexpectedly, I have found that the antibiotic by reducing the bacterial level in the meat, and thus reducing the tendering action of the bacteria, effectively acts as an arrestor for the tendering action of the enzyme so that when the two are balanced, the enzyme will not over-tender the meat and make it mushy. The result is a meat which is durable and less subject to breakdown and bacterial decomposition and at the same time is tender, the initial toughness is eliminated and the meat does not remain "green" and "unaged."

In the post mortem stitch pumping of carcasses, sides and cuts of meat, before rigor mortis has completed, amounts of a broad spectrum antibiotic such as oxytetracycline are used to give a tissue level of 1 p.p.m. to 10 p.p.m. With this amount of antibiotic as little as .01 gram of a purified, high potency proteolytic enzyme, such as papain, per 100 pounds of weight of meat may be used in an aqueous solution weighing approximately 1 to 3%, and usually approximately 2%, of the weight of the meat to be injected.

The enzyme papain is representative of the enzymes currently commercially available. This enzyme can be isolated for use by salting-out methods similar to those used for recovery of other proteolytic enzymes. The product extracted from undried papaya latex by water can be fractionated by 0.4% concentration with ammonium sulfate and almost complete saturation with sodium chloride. At 5° C. and pH 6, the crystals of papain are almost completely salted out by 2% sodium chloride. While this procedure produces pure crystalline papain, preparations containing crude papain or other proteolytic enzymes are commercially available and are acceptable for use in the process above described.

If the meat is to be injected after chilling then approximately 1 gm. of the same enzyme per 100 pounds of meat weight must be used in the solution.

In ante mortem injection the amounts of proteolytic enzyme should equal at least about 0.5 mg. of enzyme per pound of live weight of the animal and the amounts of antibiotic should range from approximately 0.5 to 10.0 mg. per pound of live weight of the animal to give a meat tissue level of 1 p.p.m. to 10 p.p.m. The infusion solution should contain about 25 to 100 parts per million of the antibiotic.

In post mortem injection of a broad spectrum antibiotic about .10 gram to 1 gram of the antibiotic is used in the solution to be injected into the carcass in a volume of around 1 to 3%, and usually approximately 2%, of the carcass weight to give a meat tissue level of 1 to 10 p.p.m.

When live cattle are injected with a proteolytic enzyme, as described in the Beuk et al. patent referred to above, the blood stream carries the enzyme to the liver. The function of the liver is to rid the blood stream of impurities. The result, from a tenderization standpoint, is that the liver gets too much enzyme and becomes so soft and mushy that it is not suitable for sale. In order to combat this, Beuk et al. have reduced the amount of enzyme so that the liver is saleable but the carcass meat is not made tender enough. In other words, to make the meat tender, the liver must be destroyed. If livers are to be saleable, then the meat is not noticeably more tender.

If, however, an antibiotic is used with the enzyme, as in the present invention, the liver, and the balance of the meat, is made durable by the buffering of the enzyme and by the killing of the bacteria by the antibiotic. Thus, the tough, "green" liver is not made mushy or too tender. Instead, the only undue tenderizing effect in the present process is to soften the tough blood vessels of the liver. This is desirable. The balance of the liver, and the balance of the meat requires the enzyme to counteract the anti-bacerial toughening effect of the antibiotic or, to put it another way, the antibiotic buffers the enzyme and the meat needs the enzyme because there are no bacteria to make the meat tender.

It should now be apparent that the present concept provides novel processes for tendering meat and at the same time for preserving the meat in which, most unexpectedly, the antibiotic employed to hold down bacterial development and preserve the meat acts as a stabilizer of the meat against undue enzyme activity and a barrier and an arrestor for the enzyme employed to tender the meat so that the meat is not over tendered or made mushy. The antibiotic and the enzyme thus combine co-operatively, helpfully and synergistically to produce fresh beef, lamb, or veal of improved tenderness and improved condition such improvement being greater than the sum of the obvious results of each.

Changes in or modifications to the processes of the present concept may now be suggested to those skilled in the art without departing from the present invention. Reference should therefore be had to the appended claim to determine the scope of this invention.

What is claimed is:

In a process for tendering and preserving meat, the step of injecting ante mortem into the blood stream of the animal an aqueous solution of approximately 0.5 mg. per pound of live weight of the animal of a proteolytic enzyme and a broad spectrum antibiotic sufficient to give a tissue level of antibiotic of from 1 p.p.m. to 10 p.p.m. and then slaughtering the animal in approximately thirty minutes to four hours.

References Cited in the file of this patent

UNITED STATES PATENTS

| | | |
|---|---|---|
| 2,786,768 | Deatherage | Mar. 26, 1957 |
| 2,866,708 | Broquist et al. | Dec. 30, 1958 |
| 2,903,362 | Beuk et al. | Sept. 8, 1959 |
| 2,942,982 | Wrenshall et al. | June 28, 1960 |